United States Patent
Yaoqi

(10) Patent No.: US 10,266,438 B2
(45) Date of Patent: Apr. 23, 2019

(54) METHOD FOR REDUCING COD OF WASTEWATER WITH IMPROVED UTILIZATION EFFICIENCY OF OZONE

(71) Applicant: Beijing Welltrailing Science and Technology Company, Beijing (CN)

(72) Inventor: Huang Yaoqi, Beijing (CN)

(73) Assignee: Beijing Welltrailing Science and Technology Company, Beijing (CN)

( * ) Notice: Subject to any disclaimer, the term of this patent is extended or adjusted under 35 U.S.C. 154(b) by 236 days.

(21) Appl. No.: 15/341,886

(22) Filed: Nov. 2, 2016

(65) Prior Publication Data
US 2017/0174541 A1   Jun. 22, 2017

(30) Foreign Application Priority Data
Dec. 18, 2015   (CN) .......................... 2015 1 0958708

(51) Int. Cl.
| | | |
|---|---|---|
| *C02F 1/78* | (2006.01) | |
| *C02F 1/72* | (2006.01) | |
| *C02F 1/68* | (2006.01) | |
| *C02F 1/66* | (2006.01) | |

(52) U.S. Cl.
CPC ............... *C02F 1/725* (2013.01); *C02F 1/66* (2013.01); *C02F 1/68* (2013.01); *C02F 1/78* (2013.01); *C02F 2303/00* (2013.01)

(58) Field of Classification Search
CPC .... C02F 1/725; C02F 1/66; C02F 1/68; C02F 1/78
See application file for complete search history.

(56) References Cited

U.S. PATENT DOCUMENTS

2002/0148790 A1* 10/2002 Krulik ................... C02F 1/5245
   210/758

FOREIGN PATENT DOCUMENTS

| CN | 101157494 A | 4/2008 |
|---|---|---|
| CN | 103771650 A * | 5/2014 |

* cited by examiner

*Primary Examiner* — Chester T Barry
(74) *Attorney, Agent, or Firm* — Klarquist Sparkman, LLP

(57) ABSTRACT

Provided is a method for reducing COD of wastewater with improved utilization efficiency of ozone. The method achieves an objective by adding agents for removing hydroxyl radical scavengers produced by base-catalyzed ozone advanced oxidation to wastewater. The addition of calcium ion, barium ion, etc. to a base-catalyzed ozonation system makes the hydroxyl radical scavengers form precipitates, separated from water and lose the capability of scavenging hydroxyl radicals, thereby enhancing ozone utilization efficiency. Furthermore, calcium ion, barium ion, etc. form precipitates with partial organic acids yielded in the wastewater ozonation and are separated from water, hence diminishing ozone consumption and indirectly improving the ozone utilization efficiency in the wastewater treatment. The present invention can not only significantly enhance the reaction rate and utilization efficiency of ozone, saving reaction time and costs, but also enable complete mineralization of the organic compounds, significantly reducing COD and total phosphorus of wastewater.

9 Claims, No Drawings

METHOD FOR REDUCING COD OF WASTEWATER WITH IMPROVED UTILIZATION EFFICIENCY OF OZONE

CROSS REFERENCE TO RELATED APPLICATION

This application claims priority from China Application No. 201510958708.2, filed on Dec. 18, 2015, which application is incorporated herein by reference in its entirety.

FIELD

The present invention relates to a method of treatment of industrial wastewater, and particularly to a method for reducing COD of wastewater with improved utilization efficiency of ozone.

BACKGROUND

Ozone reactions in water can be classified as direct and indirect reactions. Direct reactions are selective reactions and their rate constants are very low, generally in the range of $1.0\text{-}10^3$ $M^{-1}s^{-1}$. Indirect ozone reactions are via free hydroxyl radical oxidation, and the reactions of hydroxyl radicals with organic compounds are non-selective and have high rate constants within $10^8\text{-}10^{10}$ $M^{-1}s^{-1}$. In terms of the features of the two reaction manners of ozone and organic compounds in water, indirect ozone reactions are of great significance, especially in the treatment of wastewater which is difficult to be degraded. Indirect reactions of ozone are radical reactions which follow the laws of free radical reactions, including chain initiation, chain propagation and chain termination. Typical hydroxyl radicals scavengers in water treatment have been summarized in "Ozonation of Water and Wastewater: A Practical Guide to Understanding Ozone and its Applications", Christiane Gottschalk et al (Eds.), mainly encompassing $HCO_3^-$, $CO_3^{2-}$, $PO_4^{3-}$, humic acid, aromatic compounds, isopropyl alcohol, TBA and so forth, wherein, $HCO_3^-$ and $CO_3^{2-}$, especially $CO_3^{2-}$, are strong hydroxyl radical scavengers often encountered. The equations for the reactions of hydroxyl radicals with them are depicted as follows:

Carbonate radicals are non-reactive with organic compounds (in the presence of hydrogen peroxide, carbonate radicals are capable of converting hydrogen peroxide into hydroxyl radicals).

Rate constants for reactions of hydroxyl radicals with partial low-molecular-weight organic acids (or acid anions) and inorganic acid anions are shown in Table 1. As can be seen from Table 1, the rate constant of the reaction between carbonate anions and hydroxyl radicals is far higher than that between these low-molecular-weight organic acids (or acid anions) and hydroxyl radicals, and the rate constant for the reaction between bicarbonate anion and hydroxyl radical is also higher than the rate constant of the reaction between oxalic acid (or oxalate anion) and hydroxyl radicals. In this case, a great amount of hydroxyl radicals yielded by catalytic decomposition of ozone is wasted by carbonate and bicarbonate anions, retarding reactions with low-molecular-weight organic acids. The process of treatment of wastewater by base-catalyzed ozonation is a mineralization process of organic compounds. With the proceeding of reactions, more and more carbonate and bicarbonate anions accumulate in water, which increasingly retards the reaction between ozone and organic compounds, resulting in the rise of treatment cost. The rate constant of the reaction between phosphate and hydroxyl radical approximates to that of between oxalic acid and hydroxyl radical, is lower than that of most of the low-molecular-weight organic acids, indicating a far lower capability to reduce the utilization efficiency of ozone than carbonate anion.

TABLE 1

Rate constants of reactions of hydroxyl radicals with partial low-molecular-weight organic acids (or acid anions) and inorganic acid anions

| Reactants | k ($\times 10^7$) ($M^{-1}s^{-1}$) |
| --- | --- |
| Formic acid | 13 |
| Acetic acid | 1.6 |
| Acetate anion | 8.5 |
| Oxalic acid | 0.14 |
| Oxalate anion | 0.77 |
| Malonic acid | 2 |
| Carbonate anion | 42 |
| Bicarbonate anion | 1.5 |
| Dihydrogen phosphate anion | <0.01 |
| Hydrogen phosphate anion | 0.22 |

Regarding how to remove carbonates in wastewater which act as hydroxyl radical scavengers yielded during ozonation, a method of pH sequential ozonation processes which are carried out at alternating time periods of acid and basic pHs is described in "Ozone Reaction Kinetics for Water and Wastewater Systems," Fernando Juan Beltran Novillo, Ph.D. When the ozonation proceeds under a basic condition, mineralization of organic compounds produces carbonates. Upon the accumulation of carbonates to a certain extent in wastewater, pH is adjusted to an acid pH, which removes carbonates from water in the form of carbon dioxide. After removal of carbonates in water, pH is increased (by adding basic) again, and then indirect reactions are conducted. Alternating cycles in such way achieve the objective of removing COD in water. Such method for removing hydroxyl radical scavenger carbonates entails complicated operation procedures, consumes a large amount of acids and bases and requires high costs. Furthermore, the carbon dioxide has certain solubility in water after all, giving rise to a portion of carbon dioxide left in water. Particularly, in the case of low-temperature reactions, the residual amount of carbon dioxide is greater (e.g. the solubility of carbon dioxide is 2.318 g/1000 g water under a pressure sum of 0.101 MPa (including atmospheric pressure and water vapour pressure) at 10° C.), which will influence the effect of removal of hydroxyl radical scavengers, hence affecting utilization efficiency of ozone.

A good number of methods of improving the utilization efficiency of ozone in indirect reactions are available, such as catalysis of base, catalysis of metal catalyst, catalysis of hydrogen peroxide, catalysis of activated carbon, UV radiation, ultrasound, microwave, etc. These methods all focus on how to decompose ozone into hydroxyl radicals quickly and efficiently, but not to enhance the utilization efficiency of ozone from the perspective of the product from ozonation of the organic compounds in the wastewater or the removal of hydroxyl radical scavengers. In U.S. Pat. No. 6,913,698B2 "Method for reducing COD (chemical oxygen demand) in waste water by using $O_3$ with valent ion chelation", organic acid intermediates formed from the oxidization of organics with ozone will chelate with valent ions dissolved in water and precipitate from the waste water, so as to reduce the amount of ozone consumed and save cost. Appropriate valent ions in the patent encompass sodium ion, potassium ion, calcium ion, magnesium ion, aluminum ion, iron ion, chromium ion, titanium ion and niobium ion. Nevertheless, salts generated by lots of acids afforded by oxidization of organic compounds, especially the low-molecular-weight organic acids and these valent ions have relatively high solubility. For example, various salts of formic acid and acetic acid are substantially water-soluble, and they are difficult to be separated from water. Only calcium oxalate and ferrous oxalate among oxalates are of lower solubility. Calcium oxalate can be separated from water, and under a basic condition, ferrous ion is precipitated in a form of hydroxide which might be precipitated in a form of ferrous oxalate. The solubility of magnesium oxalate is 0.104 g/100 g water (20° C.). Only if the solubility product of oxalate ion and magnesium ion in water is greater than $8.57 \times 10^{-5}$, can magnesium oxalate precipitate be yielded, to separate the oxalate ion from wasterwater.

In Chinese patents CN1699212A "Application of brucite in ozonization treatment of organic wastewater" and CN101157494A "Application of half-burning brucite in ozonization water purification and method thereof," the pH of the system is balanced by adding brucite and other alkaline minerals to wastewater, thereby improving the oxidization efficiency of ozone. Here, brucite functions as a base, which is actually a base catalyst in the base-catalyzed treatment of wastewater by ozone. In Chinese patent CN103771650A "Method for treating coal gasification wastewater," coal gasification wastewater is subjected to softening pretreatment by using lime, to conduct chemical precipitation on calcium salts and magnesium salts with lime milk in water to reduce the water hardness. After adjusting the pH value of the wastewater to 8.5~10.0 by lime softening, the ozone oxidization treatment is carried out. In this patent, lime serves to remove calcium and magnesium ions and reduce water hardness as well as to adjust the pH of wastewater.

In Chinese patent CN102464422B "Method for pretreating industrial wastewater," wastewater produced by a pharmaceutical industry is disposed of. After the treatment by iron-carbon micro-electrolysis and ozone oxidization process, a mixture of calcium oxide and calcium chloride is added for the aim of removing the sulfate ion in water and prevent the influence on the biochemical treatment of wastewater. In Chinese patent CN101164919A "Deep treatment method for garbage percolate," after garbage percolate is oxidized by hydrogen peroxide or ozone, complexing agents containing calcium or barium are added to the oxidized solution, to make the organic intermediate products containing carboxyl group, carbonyl group or hydroxyl group generated by the oxidation precipitate under a basic condition and separated from water, hence reducing COD of wastewater. In this patent, the complexing agents containing calcium or barium serve to precipitate the organic intermediates after the oxidation.

SUMMARY

To address the problems existing in the prior art, an objective of the invention is to provide a method for reducing COD of wastewater with improved utilization efficiency of ozone. During the base-catalyzed ozonation to reduce COD in wastewater, at least one agent capable of removing hydroxyl radical scavengers bicarbonate anions, carbonate anions and phosphates is added to diminish waste of hydroxyl radicals and reduce or eliminate the capability that hydroxyl radical scavengers compete with low-molecular-weight organic acids produced by ozonation for scavenging hydroxyl radicals, enabling continuous mineralization of low-molecular-weight acids. Furthermore, the agent added to remove hydroxyl radical scavengers is also capable of forming precipitates with part of organic acids yielded in ozonation of wastewater, which are separated from the reaction system, saving part of the utilized amount of ozone. The agent added to eliminate hydroxyl radical scavengers can exert phosphorus-removal effect on the wastewater containing phosphorus as well.

The principle of the present invention is: during the base-catalyzed ozonation to reduce COD in wastewater, carbonate and bicarbonate anions are generated gradually, which scavenge hydroxyl radicals resulted from the base-catalyzed decomposition of ozone and convert hydroxyl radicals generated by decomposition of ozone into hydroxyl ion, rendering the utilization efficiency of ozone lower. In addition, the rate constants for the reactions between low-molecular-weight acids and hydroxyl radicals approximate to the rate constants for the reactions of hydroxyl radicals with carbonate or bicarbonate anions, resulting in that low-molecular-weight acids fail to undergo complete mineralization in the presence of a great amount of carbonates. After the addition of calcium ion, barium ion and so on to wastewater, the calcium ion, barium ion and so on react with carbonates to afford precipitates of calcium carbonate and barium carbonate with rather low solubilities, and reaction equations are shown as follows:

$$CO_3^{2-} + Ca^{2+} \rightarrow CaCO_3 \downarrow k_{sp} = 2.8 \times 10^{-9}$$

$$CO_3^{2-} + Ba^{2+} \rightarrow BaCO_3 \downarrow k_{sp} = 5.1 \times 10^{-9}$$

In highly alkaline wastewater, bicarbonate anions are converted into carbonate anions:

$$HCO_3^- + OH^- \rightarrow CO_3^{2-} + H_2O$$

The resulting precipitates are separated from the wastewater, and lose capability of scavenging hydroxyl radicals, thus enhancing the utilization efficiency of ozone. Moreover, due to the absence of interference by carbonates, ozone is enabled to oxidize low-molecular-weight organic acids more efficiently.

In addition, some industrial wastewater contains phosphates, and $PO_4^{3-}$, $HPO_4^{2-}$, $H_2PO_4^-$ all serve as hydroxyl radical scavengers. Under a basic condition, the addition of calcium ion and barium ion to wastewater can also convert phosphates into precipitates of calcium and barium salts, which are then separated from water. The reaction equations are depicted as follows:

$$2PO_4^{3-} + 3Ca^{2+} \rightarrow Ca_3(PO_4)_2 \downarrow k_{sp} = 2.0 \times 10^{-29}$$

$$2PO_4^{3-} + 3Ba^{2+} \rightarrow Ba_3(PO_4)_2 \downarrow k_{sp} = 3.4 \times 10^{-23}$$

In highly alkaline wastewater, hydrogen phosphate and dihydrogen phosphate anions are converted into phosphate anions:

$$H_2PO_4^- + 2OH^- \rightarrow PO_4^{3-} + 2H_2O$$

$$HPO_4^{2-} + OH^- \rightarrow PO_4^{3-} + H_2O$$

In order to achieve the technical objective, the technical solution employed by the present invention is: during the base-catalyzed ozonation to reduce COD in wastewater, at least one agent for removing hydroxyl radical scavengers bicarbonate anions, carbonate anions and phosphates is added to wastewater, and ozone is introduced into uniformly mixed suspension to conduct the oxidation to reduce COD of wastewater.

Agents for removing hydroxyl radical scavengers bicarbonate anions, carbonate anions and phosphates are chemicals affording calcium ion or barium ion when dissolved in water.

Chemicals affording calcium ion when dissolved in water are one or more selected from the group consisting of calcium oxide, calcium hydroxide, compound alkali (also known as alternative alkali, main components: $Ca(OH)_2$, activated lime mud, diatomaceous earth, activated carbon and saturated alkaline solution) and calcium chloride, preferably calcium oxide and calcium hydroxide.

Chemicals affording barium ion when dissolved in water are barium hydroxide or barium chloride, preferably barium hydroxide.

Agents for removing hydroxyl radical scavengers bicarbonate anions, carbonate anions or phosphates are preferably calcium oxide or calcium hydroxide.

Calcium oxide (including calcium hydroxide) can not only serve to remove hydroxyl radical scavengers, but also provides a base employed in adjustment of the pH of wastewater. Furthermore, calcium oxide is of low cost and readily available, and exhibits an excellent treatment effect.

Barium hydroxide not only serves to remove hydroxyl radical scavengers, but provides a base employed in adjustment of the pH of wastewater, while barium chloride is only able to afford barium ions for removing hydroxyl radical scavengers, and fails to adjust the pH of wastewater simultaneously. Barium hydroxide is of higher price than calcium oxide (including calcium hydroxide), and the amount of barium hydroxide octahydrate used is higher than that of calcium oxide (including calcium hydroxide).

In comparison with barium hydroxide octahydrate, calcium oxide (including calcium hydroxide) is preferred.

The initial pH of the base-catalyzed ozonation to reduce COD in wastewater ranges from 10 to 14, the optimal range of pH is higher than 12.5, and the pH of outlet water ranges between 8 and 10, so as to ensure that the entire ozonation process is carried out with the catalysis of bases. The pH depends on specific water quality.

The base employed to adjust the pH of wastewater during the base-catalyzed ozonation to reduce COD in wastewater is from the agent for removing hydroxyl radical scavengers itself or a composition utilized in combination with sodium hydroxide.

During the base-catalyzed ozonation to reduce COD in wastewater, a dosage of the agent for removing hydroxyl radical scavengers is set in such a way that: when calcium oxide is used, the dosage thereof is generally 1-6 times of a COD value of wastewater; when calcium hydroxide is employed, the dosage thereof is generally 1-8 times of the COD value of wastewater; and when barium hydroxide is utilized, the dosage thereof is generally 1-30 times of the COD value of wastewater. The dosage of the agent depends on specific water quality.

By adding calcium ion, barium ion and so on to wastewater to remove hydroxyl radical scavengers-carbonates produced during the base-catalyzed ozonation or carbonates or phosphates contained in the wastewater itself and to form precipitates with a part of organic acids yielded in the ozonation of wastewater which are separated from water, the present invention achieves the objective of improving the utilization efficiency of ozone. Not only can the present invention significantly enhance the reaction rate and utilization efficiency of ozone, saving reaction time as well as costs, but it enables the organic compounds to undergo a complete mineralization, significantly reducing COD and total phosphorus of wastewater.

The present invention possesses the following advantages: (1) it significantly improves the reaction rate and utilization efficiency of ozone, saving reaction time as well as costs; (2) it enables the organic compounds in wastewater to undergo a complete mineralization, significantly reducing COD of wastewater; and (3) it is able to reduce the total phosphorus content of wastewater.

DETAILED DESCRIPTION

To further elucidate the technical means employed to achieve the intended objective of the present invention and the effect thereof, the principle and working procedures of the present invention are illustrated in conjunction with the preferable examples in detail as follows.

Example 1

Wastewater of styrene-butadiene rubber, which had undergone flocculation pretreatment and in which the COD was 721 mg/L and the total phosphorus content was 133 mg/L, was introduced to the bottom of an ozonation reactor with a volume of 1.2 L (the reactor was provided with a water outlet at its upper part, and the volume of water in the reactor is 0.9 L). A 10% suspension of calcium oxide formulated with wastewater of styrene-butadiene rubber was added to a water inlet pipe of the reactor, making calcium hydroxide present in the wastewater at a concentration of 2.0 g/L. Ozone at a concentration of 85 mg/L was introduced to the bottom of the reactor, with a gas inflow of 1.5 L/min. The wastewater was retained in the ozonation reactor for 35 min, after which sampling was carried out, and measurement of the sample after the filtering with fast filter paper indicated the COD value in the wastewater was 48.5 mg/L and the total phosphorus content was 0.04 mg/L. As contrast, the calcium oxide mentioned above was converted into sodium hydroxide (2.15 g/L) containing the same equivalent concentration of hydroxide anions to carry out the identical experiments, and it was measured that the COD value was 144 mg/L and the total phosphorus content was 117 mg/L in the wastewater.

Example 2

Wastewater of oilfield heavy oil, which had undergone flocculation pretreatment and in which the COD was 332 mg/L and the total phosphorus content was 0.02 mg/L, was introduced to the bottom of an ozonation reactor with a volume of 1.2 L (the reactor was provided with a water outlet at its upper part, and the volume of water in the reactor is 0.9 L). A 10% suspension of calcium oxide formulated with wastewater of oilfield heavy oil was added to the reactor, making calcium hydroxide present in the wastewater at a concentration of 1.65 g/L. Ozone at a concentration of 85 mg/L was introduced to the bottom of the reactor, with a gas inflow of 1.5 L/min. The wastewater was retained in the ozonation reactor for 20 min, after which sampling was carried out, and measurement of the sample after the filtering with fast filter paper indicated the COD value in the wastewater was 45.2 mg/L, with total phosphorus undetected. As contrast, the calcium oxide mentioned above was converted into sodium hydroxide (1.75 g/L) containing the same equivalent concentration of hydroxide anions to carry out the identical experiments, and it was measured that the COD value in the wastewater was 118 mg/L, and the total phosphorus content was 0.24 mg/L.

Example 3

Wastewater of acrylonitrile, which had undergone flocculation pretreatment and in which the COD was 2451 mg/L, was introduced to the bottom of an ozonation reactor with a volume of 1.2 L (the reactor was provided with a water outlet at its upper part, and the volume of water in the reactor is 0.9 L). A 10% suspension of calcium oxide formulated with wastewater of acrylonitrile was added to the reactor, making calcium hydroxide present in the wastewater at a concentration of 10 g/L. Ozone at a concentration of 85 mg/L was introduced to the bottom of reactor, with a gas inflow of 1.5 L/min. The wastewater was retained in the ozonation reactor for 90 min, after which sampling was carried out, and measurement of the sample after the filtering with fast filter paper indicated the COD value in the wastewater was 49.7 mg/L. As contrast, the calcium oxide mentioned above was converted into sodium hydroxide (10.75 g/L) containing the same equivalent concentration of hydroxide anions to carry out the identical experiments, and it was measured that the COD value in the wastewater was 1,650 mg/L.

What has been described above is merely for the purpose of illustration of the present invention, it should be appreciate that the present invention is not limited to the foregoing examples, and various variant forms in accordance with the conception of the present invention fall within the protective scope of the present invention.

I claim:

1. A method for reducing COD of wastewater with improved utilization efficiency of ozone, wherein during base-catalyzed ozonation to reduce the COD in the wastewater, at least one agent capable of producing calcium ion or barium ion is dissolved in water and uniformly mixed, and then ozone is introduced to conduct the oxidation to reduce the COD of wastewater, thereby removing hydroxyl radical scavengers in the wastewater under a basic condition, wherein initial pH of the wastewater during the base-catalyzed ozonation ranges from 10 to 14, pH of outlet water ranges from 8 to 10, and the pH depends on specific water quality.

2. The method for reducing COD of wastewater with improved utilization efficiency of ozone according to claim 1, wherein the agent is one or more selected from the group consisting of calcium oxide, calcium hydroxide, compound alkali, calcium chloride, barium hydroxide and barium chloride.

3. The method for reducing COD of wastewater with improved utilization efficiency of ozone according to claim 2, wherein components of the compound alkali comprise: Ca(OH)2, activated lime mud, diatomaceous earth, activated carbon and saturated alkaline solution.

4. The method for reducing COD of wastewater with improved utilization efficiency of ozone according to claim 2, wherein the agent is calcium oxide.

5. The method for reducing COD of wastewater with improved utilization efficiency of ozone according to claim 2, wherein the agent is barium hydroxide.

6. The method for reducing COD of wastewater with improved utilization efficiency of ozone according to claim 1, wherein the initial pH of the wastewater during the base-catalyzed ozonation is higher than 12.5.

7. The method for reducing COD of wastewater with improved utilization efficiency of ozone according to claim 1, wherein the base for adjusting the pH of the wastewater is from the agent for removing hydroxyl radical scavengers itself or an agent used in combination with sodium hydroxide.

8. The method for reducing COD of wastewater with improved utilization efficiency of ozone according to claim 2, wherein dosage of the agent for removing hydroxyl radical scavengers is set in such a way that: when calcium oxide is used, the dosage of the calcium oxide is generally 1-6 times of a COD value of the wastewater; when calcium hydroxide is used, the dosage of the calcium hydroxide is generally 1-8 times of the COD value of the wastewater; and when barium hydroxide octahydrate is used, the dosage of the barium hydroxide octahydrate is generally 1-30 times of the COD value of the wastewater; and the dosage of the agent depends on specific water quality.

9. The method for reducing COD of wastewater with improved utilization efficiency of ozone according to claim 1, wherein before being added to the wastewater to be treated, the agent is formulated into a suspension of the agent, and then the suspension is added to the wastewater to be treated.

* * * * *